United States Patent [19]
Renner

[11] 3,753,540
[45] Aug. 21, 1973

[54] NOSE WHEEL STEERING

[75] Inventor: Eckard Renner, Achim, Germany

[73] Assignee: Vereinjgte Flugtechnische Werke-Fokker GmbH, Bremen, Germany

[22] Filed: Oct. 5, 1970

[21] Appl. No.: 77,806

[30] Foreign Application Priority Data
Oct. 17, 1969 Germany................. P 19 52 348.9

[52] U.S. Cl. ............................................. 244/50
[51] Int. Cl. ............................................. B64c 25/50
[58] Field of Search ....................... 244/50, 103 R

[56] References Cited
UNITED STATES PATENTS

| | | |
|---|---|---|
| 2,814,452 | 11/1957 | Blanchard et al.................. 244/50 |
| 2,957,649 | 10/1960 | Powell, Jr. et al................. 244/50 |
| 2,734,589 | 2/1956 | Groen................................. 244/50 |
| 2,906,474 | 9/1959 | Cravero............................. 244/50 |
| 2,508,057 | 5/1950 | Bishop............................... 244/50 |
| 2,622,827 | 12/1952 | Hayman et al.................... 244/50 |
| 3,067,832 | 12/1962 | Wohl............................. 244/50 X |

*Primary Examiner*—Milton Buchler
*Assistant Examiner*—Paul E. Sauberer
*Attorney*—Smyth, Roston & Pavitt

[57] ABSTRACT

The nose wheel of an aircraft is gradually made steerable after touchdown by the rudder pedal in that gradually the power on the servo system (steering momentum) is increased from zero to full value, while concurrently the steering range is increased.

8 Claims, 1 Drawing Figure

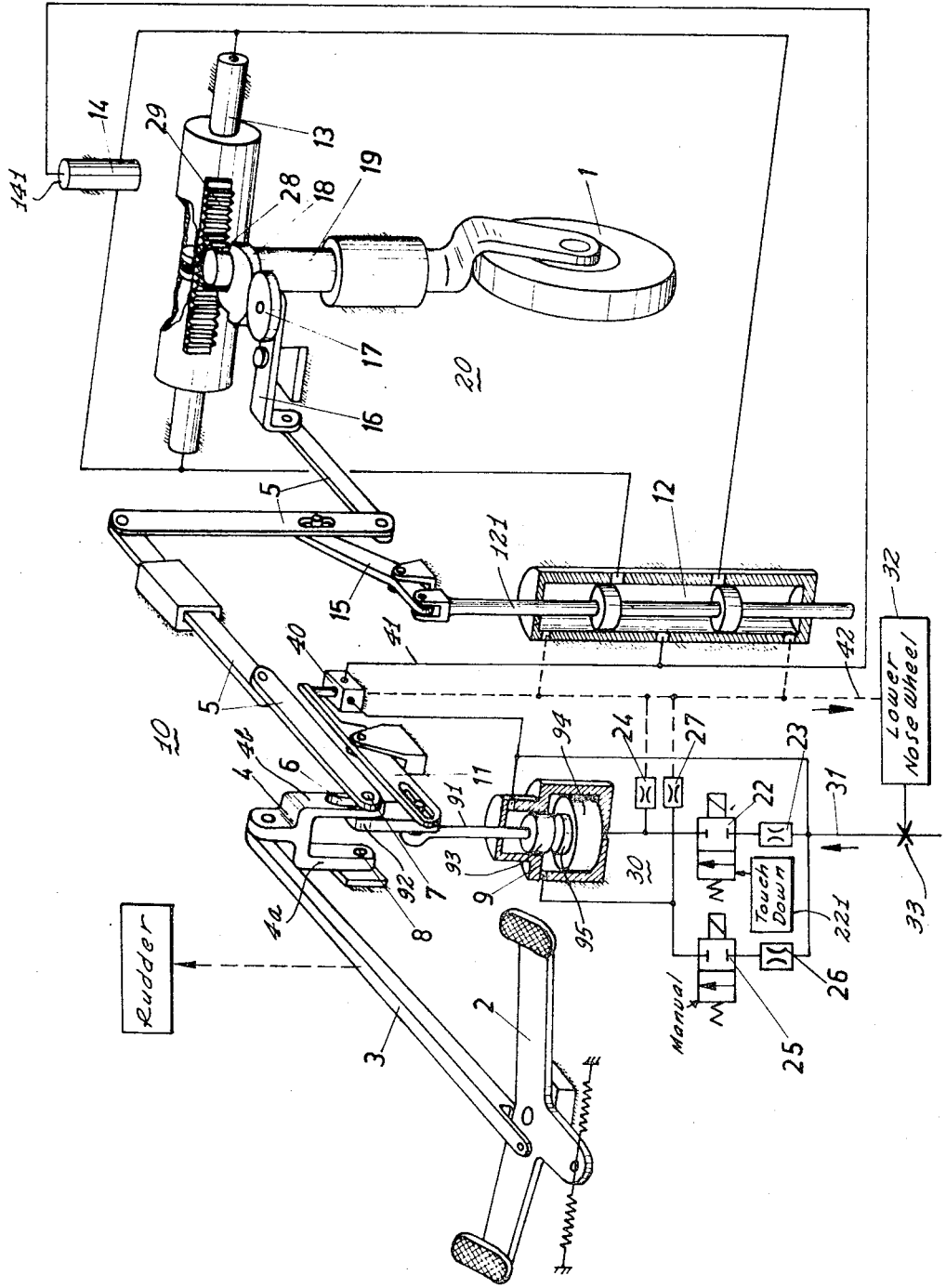

NOSE WHEEL STEERING

The present invention relates to apparatus for steering the nose wheel or front wheel of an airplane, whereby the pedal operating the rudder is the principal actuator for servo control and steering of the nose wheel. The invention concerns particularly the transmission interposed between the foot pedal and the power steering mechanism for the nose wheel.

In the past many airplanes have been constructed in that during landing the pilot turned on directly the hydraulic power steering of the nose wheel. It is also known, however, to provide such turn on action indirectly and gradually, in that turnover of control of the nose wheel steering servo to the rudder foot pedals was provided by increasing the steering effect produced for a particular foot pedal deflection. Such enableness refers to the effectiveness of the control signal as to steering deflection of the nose wheel. In the following I shall refer to degree of enableness in and of the transmission between nose wheel steering control and actual nose wheel steering as quantitative representation of the ratio between a particular "unit" foot pedal deflection (for example maximum possible deflection) and the resulting steering angle of the nose wheel. For a low degree of enableness that angle is small; for maximum enableness there is full steerability; for zero enableness or complete disabling, actuation and manipulation of steering control has no influence on the nose wheel.

The degree of enabling can be made subject to control. As the plane lands, the enabling control is adjusted to a rather low degree so that the nose wheel can be steered only over a very limited range while the craft proceeds at high speed. However, as the plane rolls towards a stop and has to be steered off the runway towards a hangar, the passenger terminal etc., the steerability of the nose (i.e. the degree of enableness as defined), has to be high so that the plane can, in fact, be steered fully through steering of the nose wheel.

In case of indirect steering it is of advantage and actually necessary to disable steerability of the nose wheel during retraction of the nose wheel, i.e., in flight. As the plane approaches the runway for landing, the nose wheel is lowered and that, in turn, may turn on the steering.

Now, it has to be considered that during landing, an airplane is often subjected to crosswinds. Therefore, if the side rudder pedal is used also for steering the nose wheel, that wheel may assume and retain an angle to the direction of motion of the still fast moving airplane upon touchdown. As a consequence, lateral forces act on the plane and endanger its landing.

The problem is compounded in case of side winds acting on a vertically landing airplane. The resulting forces tend to topple the plane. In order to avoid that danger the undercarriage has to be over-sized accordingly. Moreover, it is customary to construct planes for vertical starting and vertical landing operation in that the rudder pedal is directly and immediately available for steering of the nose wheel so that the pilot is free to supervise other control and operating procedures. Now, crosswinds are indeed very dangerous even for an oversized undercarriage.

The present invention avoids the disadvantages outlined above particularly in those cases where the rudder pedals do serve simultaneously for steering of the nose wheel. The invention has the following specific combination features. Following touchdown, the degree of enabling for steering the nose wheel via the rudder pedals is gradually increased while simultaneously the steering momentum, i.e., the power gain as between rudder pedal operation and power exerted by the servo steering upon the nose wheel for changing its angle is also increased but gradually. In other words, the ratio of pedal deflection, for example, for maximum actuation to resulting steering angle changes gradually so as to increase that angle, while available steering momentum increases concurrently thereto.

Just prior to touchdown, the nose wheel is not subjected to external forces so that it may be steerable to a limited extent even by a very small steering momentum. Upon touchdown and shortly thereafter, frictional engagement of the wheel upon the runway forces the wheel into the direction of the plane motion, as the steering momentum is held low. In case of a regular plane, maneuvering is provided essentially through side rudder operation as long as the craft has sufficient forward speed. The effective coupling between rudder pedal and nose wheel is zero or still very small during that landing phase. As the speed of the plane declines on the runway, steerability of the nose wheel is increased twofold while concurrently the effect rudder manipulation can exert upon the plane reduces due to declining speed. As to the pilot, the plane remains steerable throughout. Steerability of and through the nose wheel is increased by gradually increasing the degree of enabling as between pedal deflection and producible nose wheel steering angle in response thereto, whereby the steering power acting on the wheel is gradually increased slowly overcoming external forces acting on the wheel. Steerability thus gradually attained may not, however, cover full range nor have full power. However, full range-full power gain may be introduced by the pilot when the plane is regarded as having landed and should turn off the runway.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates in perspective view and schematically to some extent the steering mechanism for the nose wheel improved in accordance with the present invention.

Proceeding now to the detailed description of the drawings. In the FIGURE thereof is illustrated a nose wheel or front wheel 1 of an aircraft. This nose wheel 1 can be steered by a foot pedal 2 providing steering via transmission system constructed in accordance with the features of the invention. The principal "regular" function of pedal 2 is the operation of the rudder of the aircraft. However, that operation is not part of the present invention except that this operation establishes the background conditions: The pedal 2 is operated for purposes of rudder control during regular flight as well as during landing. As long as the plane has sufficient forward speed lateral control is exercised upon the craft by rudder operation, even after touchdown. However, as the plane slows down on the runway, steerability of the plane by means of the rudder decreases.

The linkage between foot pedal 2 and nose wheel 1 includes a rod and lever system 10, a hydraulic servo and power steering section 20 operated by system 10 and a hydraulic control section 30 controlling both systems, 10 and 20, for graduated and stepwise enabling and effectiveness or total disabling thereof.

During flight the nose wheel 1 is retracted and cannot be steered by foot pedal manipulation. Therefore, control section 30 disables operative connection between pedal 2 and nose wheel 1. The disabled state of parts 10, 20 and 30 are established as follows.

A switching device 32 closes a valve 33 to block off hydraulic pressure supplied by a suitable source (not shown) to hydraulic line 31. As operation of the power steering section 20 depends on that pressurized medium, that section is per se disabled.

The foot pedal 2 is linked to lever system 10 by means of a thrust rod 3 being on its other end pivotally connected to a fork 4. This fork 4 has one of its prongs 4a journaled on a stationary pin 8 for pivoting of the fork about that pin. The other prong 4b of fork 4 is provided with an oblong slot 6. A bolt 7 traverses and is received by the slot. The relative position of bolt 7 in slot 6 is determined by the particular position of short support bar 92. The other end of bolt 7 connects to linkage rods 5 pertaining also to system 10.

As support bar 92 for bolt 7 changes position (how, will be described below) bolt 7 may slide in slot 6, essentially in between two terminal positions given by the length of the slot, but bolt 7 may be retained in any intermediate position. In one terminal position pivot pin 7 in slot 6 is coaxial with pin 8. For this, support 92 has lowest position. If fork 4, through operation of foot pedal 2, pivots with its arm 4a about bolt 8, prong or arm 4b pivots about the axis of bolt 7, and that pivot motion is not transmitted upon linkage 5. Thus, as long as bolt 7 is coaxial to bolt or journal 8, an enabling state zero or total disabling is established as far as operative connections between foot pedal 2 and steering mechanism of nose wheel 1 is concerned. However, if by operation to be described in the following, bolt 7 is displaced by support bar 92 within slot 6. Such a displacement occurs transverse to the axis of bolt 7. Therefore, bolt 7 is relocated to be eccentric to the pivot axis of fork 4, so that upon pivoting of the fork some angular deflection of bolt 7 about the axis of bolt 8 is now transmitted upon rods and lever linkage 5. The degree of eccentricity determines the degree of enabling.

On an arbitrary scale, a "unit" foot pedal deflection as producing a particular pivot angle displacement of fork 4 will result in only a small pivotal displacement of pin 7 about the axis of pin 8 for a small eccentricity relative to the pivot axis of the fork as defined by journal 8. This, in turn, will produce a small longitudinal displacement of rods 5 (producing partial range steering). On the other hand, eccentricity as between the axes of bolts 7 and 8 for the other limit position of bolt 7 in slot 6 establishes full scale or maximum degree of enableness of system 10. For that adjustment, maximum displacement of foot pedal 2 produces maximum deflection of levers 5 of which they are capable within the system, and that, in turn, will produce full range steering.

The eccentricity of bolt 7, therefor, determines the degree of enabling of the operative connection between foot pedal and steering mechanism. That eccentricity is established by the position of support bar 92 which, in turn, is operated by a piston rod 91 pertaining to a plural step valve 9. Additionally, one arm of a rocking lever 11 is linked to piston rod 91 via an oblong slot in lever 11. The other arm of that lever 11 is connected to the actuator of a pressure reducing valve 40. The pressure reducing valve 40 has its hydraulic input connected to pipe 31 and governs the application of pressure to servo steering mechanism 20 via line 41.

The servo system includes a control valve 12, which, in turn, controls a steering cylinder or linear hydraulic motor 13. The input of control valve 12 connects to the pressure line 41 as controlled by reducing valve 40. Control valve 12 has two hydraulic output lines connecting to opposite input sides of steering cylinder 13. A control piston 121 of valve 12, when in central position, causes the pressure line 41 to be connected to both sides of steering cylinder 13. Upon deflection of piston 121, one side remains so connected while the other side of steering motor 13 is vented via an outlet path 42.

Depending upon the pressure applied by valve 40 to the system, steering is carried out by force that relates directly (linearly) to that pressure. Control piston 121 is connected to an angle lever 15 which is linked to lever system 5. Thus, piston 121 of control valve 12 of the power steering mechanism is actuated by levers 5 provided pin 7 is eccentric to pin 8. In case the pins are coaxial, piston 121 has illustrated control position, and remains non-responsive to any foot pedal operation.

For an eccentric position of pin 7 an operative connection between the foot pedal 2 and the control piston of control valve 12 is established and enabled. Upon actuation of the foot pedal the control piston 121 is displaced to the extent the adjusted eccentricity permits and defines the range of permissible displacement.

However, parallel to the two inputs for motor 13 there are connected the two inputs of a limiter valve 14. That valve 14 has a third input 141 which is directly connected to pressure line 41. Valve 14 is pressure controlled in that as long as pressure in line 41 is below a threshold, the valve is in effect a bypass for steering cylinder 13, and limits the torque which is needed to turn the wheel out of its commanded position and thus works as a safety device.

The rods on linkage rods 5 are additionally connected to one arm of lever 16 having on its other arm a roll 17. This roll 17 is, in fact, a feeler that runs on a cam disk 18 which is disposed on the steering axis 19 of nose wheel 1. Next to the cam disk 18 and also on the steering axis 19 is provided a pinion gear 28 meshing a rack 29. Rack 29 is disposed on the moveable and displaceable element of steering cylinder 13. Therefor, in case sufficient pressure imbalance is established in the steering cylinder, by operation of the control valve 12 with valve 14 being closed, rack 29 is being displaced, rotates pinion 28 and nose wheel 1 is steered on the steering axis accordingly. The resulting rotation of cam 18 is fed back via roll 17 and lever 16 in terms of negative feedback to be effective upon pedal 2, and also to be effective in the servo system for reclosing valve 12, as soon as the steering angle attained corresponds to the displacement of piston 121 as initiated.

As mentioned above, nose wheel 1 is retracted during flight and nose wheel switch 32 has valve 33 closed, so that operating pressure for the servo steering mechanism is not available at all. Also, rod 91 is in lowermost position (there is no power available to establish any other position), so that operative connection between the foot pedal 2 and the control valve 12 is interrupted;

pins 7 and 8 are coaxial. There is, therefor, a twofold disabling of the steering mechanism: no power and no transmission of pedal displacement.

Before proceeding to the description of landing operation, valve 9 will be described briefly. That valve has output rod 91 whose position determines both, eccentricity of pins 7 and 8 (i.e. the steering range and reducing action of valve 40 (i.e. the power gain of the servo system).

Valve 9 has an upper chamber of small dimensions in which reciprocates a piston 93 linked directly to rod 91. A lower valve chamber of larger diameter contains a correspondingly larger piston 94 with an axial projection 95 that may push pistion 93 up. Pressure can be applied to valve 9 from above (to push piston 93 down), from below, to push piston 94 up (so that projection 95 can push piston 93 up) and in the middle, to spread the pistons apart, particularly for lifting piston 93 from projection 95.

Now, as the craft approaches landing, the nose wheel is lowered and as a first enabling step, valve 33 is opened by operation of the wheel position responsive switch 32. Full pressure is now available in line 31; pressure, therefor, is applied to the upper cylinder chamber of valve 9, now positively holding piston 93 down. Thus, piston rod 91 remains in lowermost position, wherein bolt 7 is retained in coaxial position to pivot 8. The transmission between foot pedal 2 and servo motor remains disabled. Therefor, as far as this connection is concerned, we are still in an operational or enabling state zero, i.e., complete disabling. Continued actuation of the rudder by the pilot through foot pedal 2 is therefore still not in any way transmitted upon control piston 12 for servo steering of the nose wheel.

Full pressure is applied to the reducing valve 40 via line 31. However, in this particular terminal or full disabling state lever 11, as linked to piston rod 91, actuates throttling mechanism of reducing valve 40 to such an extent that there is a minimum pressure available in output line 41 of reducing valve 40. Therefor, the hydraulic servo mechanism is under low pressure conditions only. However, nose wheel 1 undergoes no frictional engagement at this point, the craft is still airborne. Thus, in case nose wheel 1 had an undefined position for pressure-less servo steering, the low pressure now applied equally to both sides of cylinder 13, suffices to straighten the wheel.

Nevertheless, the low pressure causes but a weak steering momentum to be applied to the nose wheel. Thus, external forces, should they occur and as will be described shortly, will have little effort to overcome the steering momentum and to deflect the nose wheel 1 accordingly.

Now, it has to be considered what happens when the airplane lands. Upon touchdown, a touchdown switch 221 is actuated to open a valve 22. Valve 22 applies the hydraulic pressure of line 31 to the lower chamber in valve 9. However, a throttling device 23 is included in that connection so that the build-up of pressure below piston 94 in valve 9 is a very gradual one. In addition, a throttling device 24 interconnects that feed-in line for the lower chamber of valve 9 to the return and venting path 42 of the hydraulic system.

Pressure acts on small piston 93 from above tending to hold it down, but gradually increasing pressure acts on large piston 94. As the latter force begins to prevail projection 95 of limited dimension is permitted to enter the upper chamber of reduced width, causing piston 93 to be lifted, but only for the axial dimension of that projection 95.

As a consequence, piston rod 91 shifts support bar 92 up, slowly, to establish a particular eccentricity between bolt 7 and journal 8. This, in turn, provides a first, low-level enabling in the linkage between steering mechanism and foot pedal, corresponding to an intermediate or partial steering range for full pedal deflection. In view of operation of throttle 23 this first stage enabling is not reached suddenly but very gradual.

Due to bouncing of the plane on the runway, it may occur that nose wheel 1 lifts off the ground again. That, of course, is monitored immediately by the touchdown switch 221 which closes the valve 22 and piston rod 91 will drop back into the position corresponding to a complete disabling of the transmission between foot pedal and steering mechanism for the nose wheel. However, throttle 24 makes sure that this is also a gradual disabling.

Now, it is assumed that temporary disabling has not occured, or, if it has occured, the nose wheel is now finally in permanent engagement with the runway. Due to strong corsswinds, the pilot may have to manipulate the foot pedal to adjust the rudder to keep the plane on a straight course on the runway. Note that the craft still runs at high speed so that rudder steering remains effective. Due to gradually increasing enabling of the steering linkage 10, foot pedal motion is transmitted to some extent, as a limited deflection upon the steering mechanism, particularly upon the control piston 121 of valve 12. Concurrently thereto, lever 11 causes the reducing effect of device 40 to be gradually diminished so that pressure in line 41 increases. However, pressure responsive bypass valve 14 maintains operating pressure for steering cylinder 13 quite low at first, so that any steering of the nose wheel is carried out rather weakly. After response of valve 14 operating pressure for cylinder 13 begins to increase. The steering momentum imparted upon the nose wheel is still quite very low, but increasing in strength.

Thus, in this transition period steering momentum and nose wheel actuating force is too low at first to overcome the straightening force exerted upon the nose wheel 1 as it runs on the runway. However, as the first level of enabling is reached, the pilot exercises some steering control upon the then rather slow rolling plane.

It follows from the foregoing that, as the plane begins to slow down on the runway, there is a gradual changeover of steerability of the plane from rudder to nose wheel and at about the same rate the rudder ceases to be effective for steering while steerability of the nose wheel increases.

Therefore, in considering all of the various parameters the following automatic operation occurs upon landing. Upon approach, the pilot manipulates the foot pedal in order to keep the plane on a straight course. At that point and particularly due to the high speed, the rudder remains effective to steer the plane while still airborne. Upon touchdown, some steering momentum is exerted upon the nose wheel but, due to the high speed and low steering momentum imparted upon the wheel, it is maintained straight and is, in effect, not steered. As the plane slows down on the runway, the steering effect of the rudder diminishes, so does the need to compensate for crosswinds. Concurrently thereto, the steering momentum exerted upon the nose wheel 1 increases. Therefore, as the pilot steers by manipulating the foot pedal, he will steer so to keep the plane on a straight course and that means, control to straighten the nose wheel. The effective control operation is inherently transferred from rudder to nose wheel.

At some point during this operation, while the plane rolls toward the end of the runway, the pilot will open another valve 25. As can be seen, pressure is now applied again via a throttling device 26 to act on piston 93 so as to lift that piston from projection 95 for pushing rod 91 gradually all the way into up-position. As rod 91 reduces the effective upper surface of piston 93, pressure force from below prevails Now, maximum eccentricity between bolt 7 and pivot 8 is established, corresponding to a maximum degree of enabling of linkage 10. Again, the throttling effect 26 causes this state of maximum enableness to be reached gradually. Concurrently, the piston rod 91 shifts lever 11 into a terminal position, amounting in effect to a complete disconnection of pressure reducing device 40, and full pressure becomes available throughout the servo system. At the state of maximum enableness, the pilot has gained complete full steering range-full power gain control over the nose wheel 1, through operation of the foot pedal 2.

It can be seen from the foregoing that operation of the inventive system involves a three step process. The first step involves application of low power to the steering mechanism upon lowering of the nose wheel, but when the craft is still airborne, so that the nose wheel may touch down in straight position. Significant steerability via foot pedal does not exist up to touchdown, but touchdown initiates the second step.

The first stage of low level enableness for nose wheel steering is gradually obtained while the plane slows down on the runway, but as long as the plane has high speed, the nose wheel is externally straightened. The gradual transition from complete disabling to the first medium stage of enabling for steering is determined in essence by the throttling effect of throttles 23 and 24. During this phase the pilot gains gradually control over the nose wheel but for a limited range of angular deflection only, while the steering power available is also increased but not to the maximum available.

Up to that point the transition occurs automatically, without pilot intervention. The third step requires pilot intervention (though there could be an automatic device interposed, that is, for example, dependent upon very low speed of the craft). In either case, opening of valve 25 introduces this third step, shifting the system from the intermediate to the maximum enabling state. The throttles 26 and 27 determine the duration of that transition. Appropriate dimensioning of all of these throttles determines temporal behavior in the change of enableness very accurately.

Valve 9 is dimensioned and proportioned to shift bolts 7 so that the intermediate state of enableness has value so that for full deflection of foot pedal 2 only about a 10° of deflection of nose wheel 1 is produced, which is rather small but is sufficient to keep the plane straight on the runway. The steering momentum needed at that point is also low. In the state of full enableness, the transmission linkage is dimensioned so that for maximum foot pedal deflection wheel 1 deflects for 45° in one or the other direction at full steering power. This, of course, suffices to impart complete sufficient steerability upon the plane for steering it off the runway.

The particular mechanism above has been described primarily in relation to an airplane landing in the usual manner. In case of a vertically landing craft, the situation is quite similar. As the nose wheel 1 is lowered, it is maintained in a central or zero deflection position but at a relative low steering momentum. Upon touchdown, the limited degree of steerability is established. In case there are no crosswinds, the full state of enableness can be established immediately, as the plane does not yet roll. Therefore, the plane is immediately available for removal from the landing strip. In case a vertically starting and landing type plane lands while there are crosswinds, it does not make much difference that the landing nose wheel 1 can, in fact, be steered into a different direction. The touchdown switch in effect causes the gradual enabling as described. Soon the plane becomes steerable through the nose wheel, which again is sufficient to off-set cross winds at that point, covering a range of plus minus 10°. As the plane comes to rest, valve 25 can be opened and the plane becomes fully steerable through the nose wheel over the range of plus minus 45° in either direction.

The invention is not limited to the embodiments described above but all changes and modifications thereof not constituting departures from the spirit and scope of the invention are intended to be included.

I claim:

1. Apparatus for steering the nose wheel of an aircraft wherein the operator pedal for the rudder is to serve for steering the wheel, there being a power mechanism including a hydraulic actuator to obtain steering of the nose wheel comprising:

hydraulic means for supplying hydraulic pressure to the actuator;

first means operatively connecting the pedal to the power steering mechanism for steering the nose wheel; including a control piston for operating the hydraulic actuator, and transmission means connecting the pedal to the control piston;

second means connected to the first means for providing enabling control of the first means and controlling the transmission means therein to change the transfer ratio as defined between the amplitude of pedal deflection and effected nose wheel steering angle;

third means operating the second means in response to wheel touchdown for increasing the transfer ratio so as to increase the effective steering angle from a minimum value upon touchdown to a particular larger value; and fourth means operating in response to touchdown and including a pressure reducing valve controlled also by the third means and connected for controlling the hydraulic pressure in the actuator, for gradually increasing the pressure as effective in the actuator for gradually increasing the power gain of the steering mechanism thereby increasing the steering momentum exerted by the power mechanism upon the wheel from a value readily overcome by external forces acting upon the nose wheel upon touchdown to value sufficient for steering the plane on the ground.

2. Apparatus as in claim 1, the steering momentum being about linearly increased in time from about the instant of nose wheel touchdown, beginning with a low but non-zero momentum, the third means operating the second means concurrently for gradual increase of said ratio.

3. Apparatus as in claim 1, the actuator of the steering mechanism including a hydraulically operated steering cylinder there being a bypass provided to limit operating pressure for the cylinder in dependence upon the pressure control for the hydraulic actuator as controlled by the fourth means.

4. Apparatus as in claim 1, the transmission means of the first means including variable linkage controlled by the second means in response to touchdown; for gradually increasing the relative change of said steering angle in dependence upon said amplitude, the fourth means being coupled to the second means for concurring, dependent operation.

5. Apparatus as in claim 1, the second means coupled to the fourth means for operation thereof, the third means operating the second means concurrently with the fourth means for gradually changing the ratio from a value corresponding to a very small range for nose wheel steering angles to a ratio for a medium range for said angles, as the power gain is increased to less than full power.

6. Apparatus as in claim 1, and including hydraulic timing means for controlling the pressure reducing valve to obtain decreasing pressure reduction beginning at touchdown.

7. Apparatus as in claim 1, including means for controlling the hydraulic means for applying operating pressure to the hydraulic actuator in response to lowering of the nose wheel, the fourth means maintaining the hydraulic pressure low as effective in the actuator prior to response to touchdown, the low pressure being sufficient only to steer the nose wheel as long as not in contact with ground.

8. Apparatus as in claim 1, wherein the fourth means includes means to cause the actuator to operate at a minimum steering momentum sufficient only to steer the nose wheel without ground contact, the fourth means causing gradual increase of the steering momentum as provided by the first means in response to a subsequent touchdown.

* * * * *